United States Patent [19]

Curry, Jr.

[11] 4,282,984

[45] Aug. 11, 1981

[54] COMPOSITE CONTAINER STRUCTURE

[76] Inventor: Byron V. Curry, Jr., Box 5040, Montecito, Calif. 93108

[21] Appl. No.: 177,734

[22] Filed: Aug. 13, 1980

Related U.S. Application Data

[60] Division of Ser. No. 3,903, Jan. 16, 1979, which is a continuation-in-part of Ser. No. 928,283, Jul. 26, 1978, abandoned.

[51] Int. Cl.³ .................. B65D 90/04; B65D 5/56; B65D 3/26
[52] U.S. Cl. .................. 220/404; 220/82 R; 220/91; 220/461; 220/462; 206/583
[58] Field of Search ............... 220/403, 404, 91; 206/583, 217, 497, 628; 229/DIG. 12; 215/12 R

[56] References Cited

U.S. PATENT DOCUMENTS

| | | | |
|---|---|---|---|
| 2,172,864 | 9/1939 | Calva et al. | 220/82 R |
| 2,177,918 | 10/1939 | Vogt et al. | 220/462 X |
| 2,700,460 | 1/1955 | Hoover | 206/583 |
| 2,771,184 | 11/1956 | Ryno et al. | 206/583 |
| 3,420,400 | 1/1969 | Heisler | 220/91 |
| 3,542,282 | 11/1970 | Troth | 220/418 |
| 4,158,425 | 6/1979 | Sansbury | 220/461 |

*Primary Examiner*—George T. Hall

[57] ABSTRACT

A composite structure is shown wherein a fibrous body or a tube such as a convolute or spirally wound paper tube or mold pulp bucket supports a plastic liner within the body to form a container. The material forming the mouth of the plastic liner is overlapped around at least one end of the supporting body and the outer overlapped layer of plastic is shrunk onto and around the outer side at the end of the support. In one form of the invention, the liner may be sealed at one end to form a bag suspended within the container to hold the product and caps may be applied to the open end or in the case of a tubular body, caps can be applied to the opposite ends of the body to complete the package. Prior to the sealing the mouth of the bag with a cap crimped onto the support body over the overlapped liner material, if appropriate, the contents of the bag may be subjected to a vacuum or a pressurized condition may be established within the container to hold the contents under the most appropriate conditions for storage. In another form of the container, after the liner has been put in its place, the outside of the composite structure can be surrounded by a resin tube that is then shrunk in place over the outer surface of the filled paper tube and its capped ends to prestress the paper tube with a compressive force.

Another aspect of the invention includes the mounting of a bail handle on means carried by the paper wall of the container, the can being adapted to contain a liquid such as paint. The plastic inner liner serves as a barrier layer to protect the paper support from penetration by the liquid and seals the bail mounting against leakage from inside the can.

12 Claims, 14 Drawing Figures

COMPOSITE CONTAINER STRUCTURE

RELATED APPLICATION

This application is a division, of application Ser. No. 3,903, filed Jan. 16, 1979, which is a continuation-in-part application of my earlier filed application, Ser. No. 928,283 of July 26, 1978 for a Composite Container Structure, now abandoned.

PRIOR ART

Various types of liners within paper tubes are known as exemplified in the U.S. Pat. Nos. 156,693 to Chinnock, Nov. 10, 1874; 2,159,835 to Waters, May 23, 1939 and 2,557,576 to Simmons, June 19, 1951. These patents all show waterproof bags merely inserted within paper cartons that are then capped to complete a package.

U.S. Pat. Nos. 3,627,116 to Cooper, Dec. 14, 1971; 3,976,795 to Ando, Aug. 24, 1976 and 4,018,904 to Muraoka, Apr. 19, 1977, disclose variations of paper or plastic containers having an outer covering of plastic shrunk in place to seal the package and in some cases, to hold the cap in place or to hold the package assembled. U.S. Pat. No. 3,604,584 to Shank, Sept. 14, 1971, shows the shrinking of an abrasion resistant plastic cover onto a glass article to cover the bottom and a portion of the side wall of the container.

It should be noted too, that solid plastic containers have been proposed for use in the past to contain paint and certain other liquids distributed commercially in containers, such as in gallon buckets, however, due to limitations of expense and size, such containers have not been considered economical for use in such trade. As far as can be determined, metal cans are used almost exclusively in the retail paint distribution outlets and no paper bucket structures have ever been adapted successfully for commercial use in transporting fluids.

BRIEF DESCRIPTION OF THIS INVENTION

The container here shown is a composite paper body with a plastic liner forming a structure that is adapted to be sealed with a crimped-on cap to preserve items stored in the container either under atmospheric pressure, vacuum or pressurized conditions. The paper support has a tubular plastic liner fixed thereto, that in one form, is sealed at one end to form a bag suspended within the support with a portion of the open mouth of the bag turned back over the outside wall of the paper support. The overlapped ring of plastic liner surrounding the outside of the body is then shrunk onto the outer wall into a skintight relationship while the plastic liner within the paper tube hangs freely suspended within the interior thereof. In a variation of this form of the invention, the liner is sealed at one end as described above to form a bag that is freely suspended within the outer support but in another form of the invention, the other end of the plastic liner can be overlapped around the outer wall of the paper support at its other end to be shrunk in place at that end. Another variation can be made wherein the suspended bag can be made to fill the entire inside volume of the container to receive a fluid for storage therein.

The composite tubular structure having a suspended bag can then be closed at one end with a metal cap crimped onto the paper support to form a bottom end. At the other end of the container, the exposed open mouth of the liner is ready to receive the food or other product to be filled into the container. After the contents have been placed in the container, if desired, a vacuum can be drawn or a pressurized atmosphere can be produced therein to protect the contents during storage and whether an atmospheric or other pressure is produced within the container, a second cap can be applied over the open mouth of the container to seal the contents.

The crimping of a cap around the outside wall at the end of the container effectively seals the cap against the shrunk-on plastic outer layer to complete an airtight storage compartment that is capable, when called upon to do so, of preserving the vacuum or holding a reasonable pressure within the container. In certain instances, it may be desirable to apply an outer surface of plastic film around the sealed package and shrink that layer onto the edge surfaces of the caps and around the fibrous support. With a proper selection of material and shrinking action, a prestressed container structure can be produced that is most effective to withstand the application of a substantial pressure within the basic paper tubular or other support means.

In other forms of the invention, a length of the tubular plastic liner can be placed over a delicate object such as an egg, glasswear, or delicate electronic part or the like, that will fit easily within the container body and the portion of the plastic cylinder surrounding that object can be selectively shrunk into tight engagement therewith. After the object and tube have been placed in the container, the ends of the tube that have not yet been shrunk, can be drawn over the ends of the container and then shrunk onto the outside wall thereof to hold the article centrally suspended in a web of plastic sheeting within the container body. If deemed necessary or desirable, foam plastic cushions can be placed between the end of the container and the object and caps can be crimped onto both ends to complete the container.

Another concept makes use of two bags suspended in the container from the opposite ends, with the bottoms of the bags in contact one with the other. The overlapped end portions are then shrunk onto the outer edges of the container body and it is ready to be filled and capped. A liquid is filled into one bag and a cap is applied to the container. This cap is fitted with a nozzle and valve so that when pressure is applied to the bag holding the liquid, it can be sprayed out in a stream or atomized fog. The bag in the other end of the container is then filled with a compressed gas such as air and it is capped. The compressed air in the fully enclosed and sealed bag presses against the fluid filled bag to provide a driving force to expel the liquid through its nozzle to dispense the fluid under pressure as needed. A suitable air inlet valve can be provided in the air bag end of the container to maintain the desired compressed air supply in the air bag to substantially completely expel the liquid from its bag.

For holding and distributing liquids, a laminated paper tube may be formed by a spiral wrapping or convolute procedure to produce a can-like means for supporting the plastic liner or a support container can be formed of paper that is stiff enough to be self-sustaining such as a bucket produced from molding paper pulp. The container is designed to hold a gallon, more or less, of fluid and is provided with the usual wire bail handle pivoted to the side wall of the bucket. Provision of a carrying handle has been a problem in the design of such containers in the past because of the problem of supporting the pivoting ends of the handle in a paper wall structure.

In following the present teaching bail attaching invention, dome-shaped bearing means, having apertures in the center of the domes for receiving the pivoting ends of the bail handle, are permanently attached to the paper wall of the bucket by driving prongs integral with the bearing means through the paper wall and bending or staking the prongs against the inside wall of the bucket. The pivoting ends of the semicircular wire bail handle are supported in the apertures formed in the domes mounted on the opposite sides of the wall of the preferably cylindrical container near the mouth of the bucket.

After the prongs of the bearing means have been flattened against the inside of the wall, the interior of the bucket is then lined with the plastic insert. The liner covers the inside walls of the paper support and is either overlapped and shrunk onto the ends of the tubular support to make a paint can or the like or in the form of a paint bucket, a bag liner is inserted into the bucket to snugly fit over the bottom, up the inside wall and overlap the mouth of the bucket to be turned over and shrunk onto the upper edge of the wall forming the mouth of the container. A cap can be crimped onto one end of the can to constitute a bottom and in the bucket, the liner is designed to engage against the bottom and inside wall of the bucket to be supported by this rigid wall and in either structure, the liner seals the paper wall of the support from contact with fluid that may be filled into the container and it is to be especially noted that the liner effectively seals the bail bearing mounting means against any possibility of leakage.

After the lined container has been filled, the package is completed by the application of a cover to be sealed against the mouth of the can or bucket in contact with the liner, with the edge of the cover crimped into a fluid-tight seal around the portion of the liner shrunk onto the outside wall of the bucket. The filled and capped container may be shipped in commerce and a bail handle fitted to its bearing supports in the conventional manner.

It is therefore an object of this invention to provide an improved form of composite container having an inexpensive support for a plastic liner to form a container.

Another object of the invention is to provide a paper container with a suspended plastic bag supported therein.

Another object of the invention is to provide a paper container having a plastic liner with portions thereof overlapping the outer ends of the container to be shrunk onto the periphery thereof.

Another object of the invention is to provide a tubular paper support for a composite paper and plastic container having improved seals at the end of the container.

Another object of the invention is to provide a shrunk-on outer layer of plastic around a tubular support to prestress the paper support tube to form a composite container that is adapted to withstand a substantial internal pressure.

Another object of the invention is to provide a composite paper and plastic container adapted to hold articles stored under vacuum or pressure conditions.

Another object of the invention is to provide a container with suspension means therein for delicate objects.

Another object of the invention is to provide a composite paper and plastic lined container having liquid stored under pressure for dispensing a spray or fog of liquid therefrom.

It is yet an object of this invention to provide an improved shipping container for fluids.

Another object is to provide an inexpensive shipping container for bulk shipment of fluids in the retail trade.

Another object is to provide an inexpensive plastic-lined paper container for the bulk shipment of fluid contents.

Another object is to provide an inexpensive paper container in the order of size to hold a gallon of paint, more or less, having a bail handle supported in bearing means attached to the paper wall.

Another object of the invention is to provide an inexpensive paper container having bearing means for a pivoting bail handle supported on the paper wall of the container and a plastic liner therein for sealing the bucket to enable it to hold fluids to be shipped in commerce.

DETAILED DESCRIPTION

The composite support and plastic lined means that forms the package here shown is adapted for holding a product to be preserved and, if desired, the product may be sealed at atmospheric pressure or either under pressure or vacuum for indefinite periods of time until the product is to be used. Tennis balls, for example, may be packaged under pressure to preserve their bounce. Likewise coffee, peanuts, and other perishable products can be preserved under vacuum or an inert gas may be filled into the container to preserve the product at atmospheric pressure. Liquids such as paint, maple syrup or fats and oils or the like, may be stored at atmospheric pressure.

In its preferred form, the composite structure makes use of a conventional paper tube formed by wrapping several plies of paper strip in a spiral on a cylindrical mandrel to form an elongated tubular means. A desired length of tubing is cut from the elongated tube to produce the individual support body 9. The ends 10 of the tubular support are preferably flared slightly in a known manner for the purpose of receiving a cap 11 that is ultimately crimped onto the body after a plastic liner and the product to be stored has been placed within the body 9.

Figure 1:
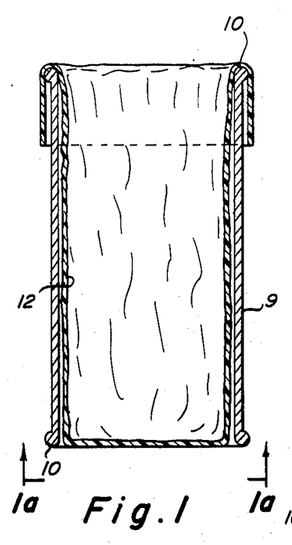
FIG. 1 is a sectional view showing a partially assembled composite tubular paper body with the resin liner in the form of a bag in place within the support with the mouth of the liner overlapped around one end of the support.
Figure 1A:
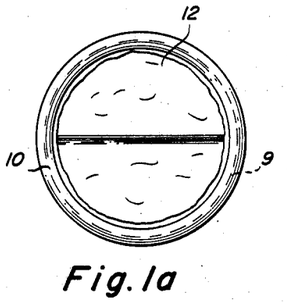
FIG. 1a is a bottom view taken on line 1a—1a of FIG. 1.
Figure 2:
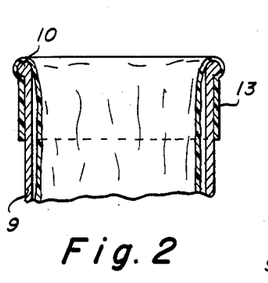
FIG. 2 shows the overlapped plastic shrunk onto the outer surface of the end of the support.
Figure 3:
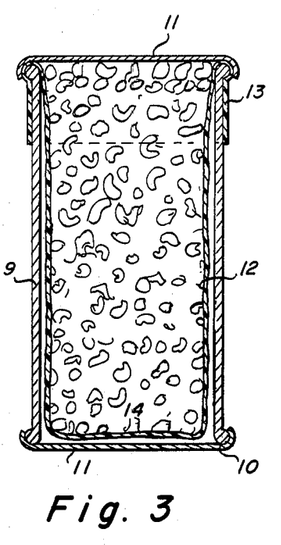
FIG. 3 shows product filled into the suspended plastic bag within the container of FIG. 2 with caps applied to both ends of the vacuumized composite container.

As shown in FIG. 1, a plastic liner 12 is loosely fitted within body 9 and at least at one end of the body, the liner extends over the top of the body and the material at the open mouth of the liner is pulled down around the outside of the body 9 about an inch. The outer overlapped material is then shrunk by known procedures to cause it to shrink into a skintight fit around the periphery of the body 9 to form a skirt 13 that is substantially integral in a skin-tight fit with the open end and around the outer surface of the support 9. The other end of the liner can be sealed at 14, as shown in FIG. 3, to produce a bag that is freely suspended within the container. In another form of the invention, as shown in FIGS. 4 and 5, the other end of the liner can be wrapped around the other end of the support body to be shrunk against the periphery at the other end of body 9 to produce the skintight skirt 15.

After the liner 12 has been placed in the support body 9 and the skirt 13 or skirts 13 and 15 shrunk onto the outer surface at one or both ends of the body, one end of the container may be sealed by crimping a cap 11 onto the bottom end of support 9. The container completed to this stage is ready for filling and can be delivered from the bottom crimping machine to a filling station.

The form of container shown in FIG. 3 is well adapted to store product under airtight conditions at either atmospheric pressure or to hold vacuumized product or alternatively to hold tennis balls, for example, under pressure. The inner liner 12 completely fills the interior of the tubular support and product may be filled into the container to the desired level. If necessary to preserve the product, the container can then have an inert gas filled into it or the container can be vacuumized or subjected to pressure as needed, the plastic liner forming an airtight barrier seal on the inside of the support, and the remaining cap is then crimped in place around the open mouth of the container and skirt 13 to completely seal the filled container. When product is held in the suspended bag form of the invention shown in FIG. 3, and the package is vacuumized, the bag 12 that is freely suspended within body 9, collapses around the product and holds somewhat tender products such as nuts from being bounced around and against one another during transport to thereby minimize damage. Also, the suspended bag form of liner has only one end that needs to have an airtight seal with a crimped-on cap, thus diminishing the length of the seal that must be made air-tight in order to eliminate in so far as possible, any leakage at a crimped seal between the cap and the end of the container.

Figure 4:
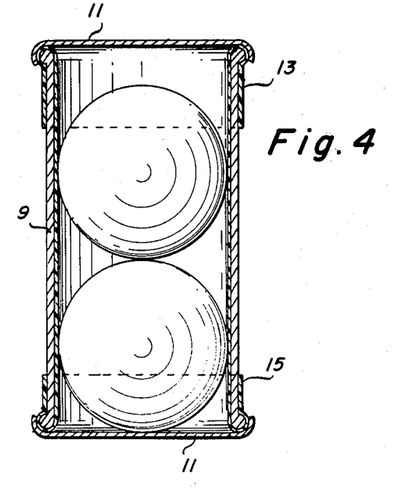
FIG. 4 is a crossectional view showing an alternate form of container having the liner overlapping both ends of and shrunk onto the support to form a composite container for holding product under pressure.
Figure 5:
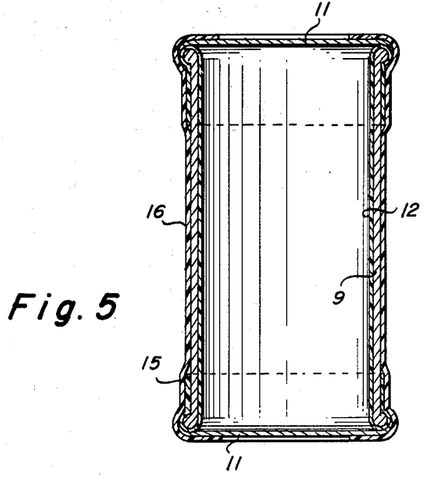
FIG. 5 shows another structure like that in FIG. 4, having an outer layer of plastic shrunk onto the periphery of the composite container to prestress the tubular support inwardly.

The form of the invention shown in FIG. 4 is preferred for holding product stored under pressure, but the form shown in FIG. 3 can be used for this purpose too and can be used when either vacuum or pressure conditions prevail. As shown in FIG. 4, two racket balls have been placed in the container and have been pressurized before the top is crimped on to store the balls in a manner to preserve the life of the balls. In this form of the invention, caps 11 at each end are crimped onto the skirts 13 and 15 at the opposite ends of the container making use of the conventional cap crimping procedures now used with plastic or metal caps. Tennis balls have been successfully stored under pressure in the container shown in FIG. 3.

Should a product require more pressure than is normally used for storing tennis balls, an additional plastic overcoat 16 can be fitted over the composite sealed container and shrunk in place to prestress the paper support tube 9 inwardly to counteract the outward pressure produced when the container is pressurized and subsequently exposed to atmospheric pressure. The overcoat 16 should extend around the ends 11 somewhat to produce a compression force along the entire length of the tube and around the sealed edges of the caps to assist in holding the internal pressure and act as an aid to hold the crimped-on covers 11 in place.

As indicated above, the tubular support 9 is preferably a spirally wound, laminated paper structure of a conventional two-ply or three-ply design. Other similar convolute paper or other forms of fibre tubes or other inexpensive lightweight supports such as molded paper buckets that may be permeable to air can be used depending upon the product to be stored or the degree of pressure or vacuum to be contained.

The liner material may be selected from the group of plastic films that can reasonably be shrunk including polyethylene, polyurethanes and polyester resins that are relatively impermeable to oxygen and nitrogen. When a special barrier and shrinkable film is needed, a laminated polyvinyl chloride and polyester or polypropylene and polyvinyl chloride laminated film can be used. These films can be coextruded in a known manner and properly oriented to increase their shrinkability. In my preferred structure, I have used 0.04 mm Cryovac film. Any resin impervious to air, that is flexible, that can be formed into a tube and that can be evenly shrunk, will serve the purpose of this invention. It is to be noted that in FIGS. 1 through 5 only, the skirt portions 13 and 15 are shrunk onto the support 9, the portion of the liner within the support is not subjected to conditions that cause it to shrink during fitment to the support or crimping-on of the caps. Thus the internal liner is not subjected to any stress during formation of container and is maintained in an ideal condition to receive product for storage. In the type of container shown in FIGS. 6 and 7, the inner liner is also shrunk onto an article within the container and the skirt portion is shrunk onto the outside of the support on at least one end thereof.

Figures 6, 7, 8:
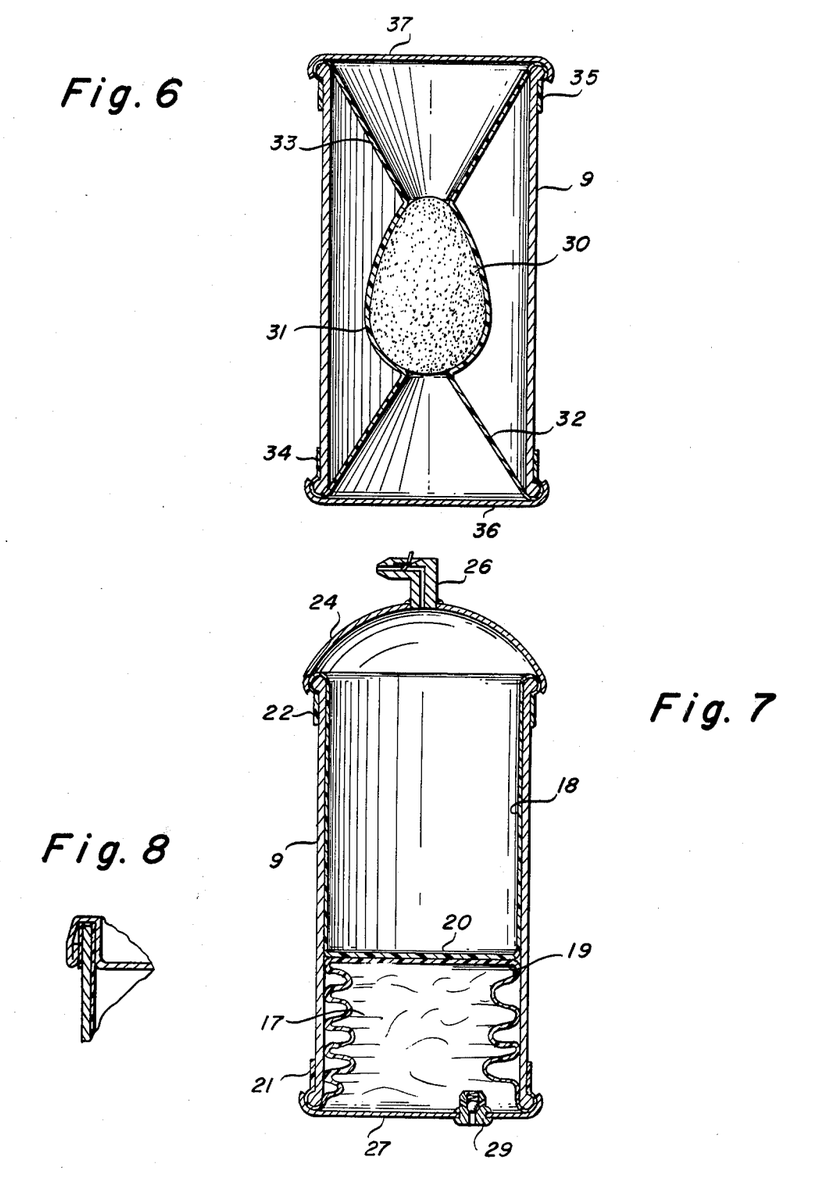
FIG. 6 is a sectional view that shows another form of the invention wherein a tubular plastic support is shrunk onto a delicate object and the object is suspended within the container with the opposite ends of the tube shrunk around the two ends of the support body.
FIG. 7 is a sectional view of still another form of the invention showing bags suspended within the container from the opposite ends thereof with their bottoms in contact and their open mouths overlapping and shrunk onto the two ends of the support.
FIG. 8 is a sectional detail showing another form of metal cap sealed onto the container shown in FIG. 3.

The caps 11 may be made of deformable plastic or laminated paper material, but are preferably metal caps that may be tightly crimped over skirts 13 and 15 to be attached to the flared ends 10 of the support 9. The shoulders 10 are provided as is conventional to receive the crimped-on caps. Another cap structure 40 is shown in FIG. 8 where it is shown that the metal of the flange 41 of the cap can be crimped back against the body of the container 9 so that the shrunk-on skirt means 13 acts as a sealing ring or gasket between the flange 41 and the end of the body. It has been found that when the skirts 13 and 15 are formed from overlapped portions of liner 12 and are shrunk to have a skin-tight fit on the outer periphery of the support 9, that the crimped-on caps 11 or 40 have a sufficiently firm grip on the plastic, without introducing any wrinkling of the plastic so as to preclude leakage when either a degree of vacuum as high as eighteen inches of mercury or a pressure of up to eighteen pounds per square inch has been produced within the sealed container.

The other forms of the invention shown in FIGS. 6 and 7 show other ways of making use of my invention. Referring to FIG. 7, for purposes of illustration, I have shown two bags, 17 and 18, sealed within the container body 9. The bags are fitted into the container with their respective bottoms 19 and 20 in contact and their open ends pulled out and turned over the ends of the container. These overlapped ends are shrunk onto the container to form the skirts 21 and 22 that fit skintight around the opposite end walls of the body 9. In this disclosure, bag 18 is adapted to be filled with a liquid and a cap 24 can be crimped in place. This cap has a conventional liquid spray nozzle 26 supported therein, which is diagrammatically shown, that is designed to direct liquid being dispensed from the container either in a fine stream or as a spray or a fog, depending upon the purpose to which the fluid being forced through the nozzle is to be put. The bag 17 at the other end of the container is filled with a compressed gas such as air so that when it is sealed with cap 27, a pressure is exerted by bag 17 against the liquid in bag 18. If desired, an air inlet or other gas pressure supply valve 29 may be mounted in cap 27 so that from time to time the bag 17 may be repressurized as the liquid is dispensed from bag 18. The bag 17 should be provided with some slack so that as the volume of bag 18 decreases when fluid is dispensed therefrom, bag 17 can easily expand to fill in that space to maintain a constant pressure on the fluid being forced through nozzle 26.

In the other form of my container shown in FIG. 6, an egg 30 is shown suspended centrally within the container 9. Any other delicate items such as glassware, pharmeceuticals, electronic parts and the like can similarly be suspended within the support body in a plastic web by inserting the object to be supported in a central position lengthwise in a tube made of the shrinkable plastic liner material. The portion of the plastic 31 surrounding the object is selectively shrunk evenly on all sides of the object to cause the egg, for example, to be centered along the longitudinal centerline of the tube. The tube and object engaged by the shrunken plastic is then threaded into the body 9 and the extending, unshrunken ends of the portions 32 and 33 of the tube are then turned down around the outer ends of support 9 to be shrunk in place thereon to form skirts 34 and 35. It should be noted that the portions 32 and 33 of the tube are gently stretched as the extending ends of the tube are turned over the ends of the body to produce a gently tensioned plastic web that supports the delicate object in a centrally suspended position within the body 9. Caps 36 and 37 can then be crimped in place over the skintight skirts 34 and 35.

Another system can be used to mount a differently shaped object in a container generally in the manner shown in FIG. 6 by first turning one end of a plastic tube over an end of the body 9 and shrinking that end in place to form a skirt 34. Then cap 36 can be applied to the body over skirt 34 and a foam plastic pad can be centered on the inside of the cap. A piece of glassware can be centered in the tube with the base of a wine glass, for example, resting on the foam pad. Then the tube within the container can be shrunk around the glass to hold this object centered in the container and supported snugly on the pad carried on the inside of the cap at one end. The free end of the tube in this structure can either be shrunk onto the article to hold it firmly centered on the pad and in the container or the free end of the tube can then be gently drawn out and around the other end of the container to be overlapped to form skirt 35 and shrunk onto the outside thereof to hold the glassware firly but gently centered on the foam pad in the container for shipment. A cap is crimped onto the other end of the container to complete the package.

In other packages making use of this invention, support bodies having a square crossection or other crossectional shapes may be used that may more conveniently accomodate shaped objects. It is only necessary to select a plastic support tube having a sufficiently large diameter to fit over the object so that the object carried at the center of the shrunken tube fits loosely within the support body with its end or ends overlapping an end or both ends of the support in a manner to be shrunk onto the body without tearing the plastic material that holds the object suspended within the interior of the body.

Figure 9:
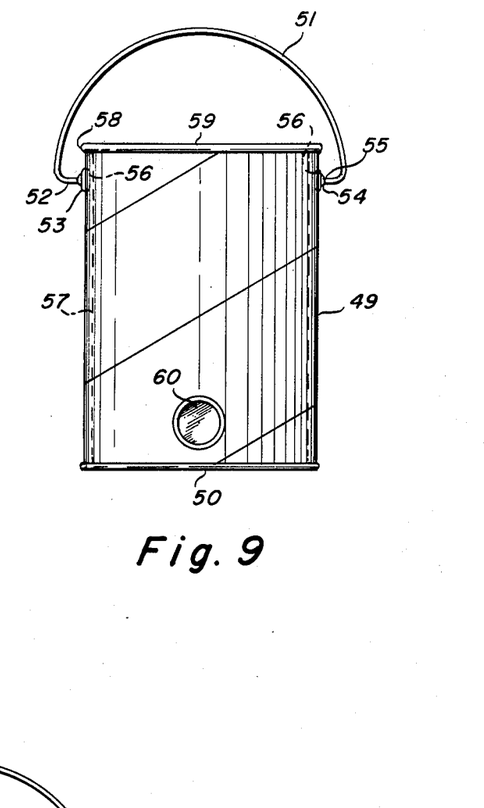
FIG. 9 is a view similar to FIG. 4 showing a spirally wound paper cylinder forming a support for a container having a window in its wall, adapted for distributing paint or the like stored therein at atmospheric pressure, showing the bail bearing support means.
Figure 11:
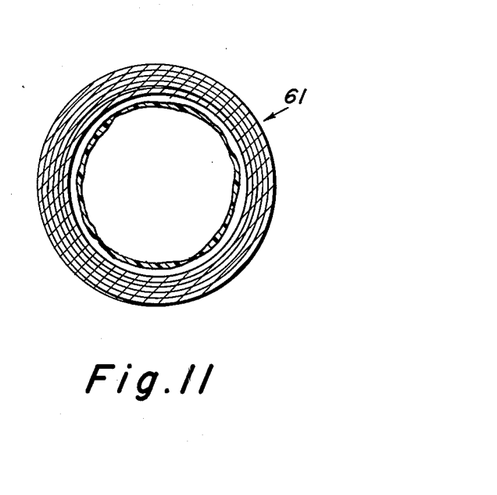
FIG. 11 is a plan view of the container shown in FIG. 10, with the thickness of the paper layers exaggerated; taken on line 11—11 of FIG. 10.
Figure 12:
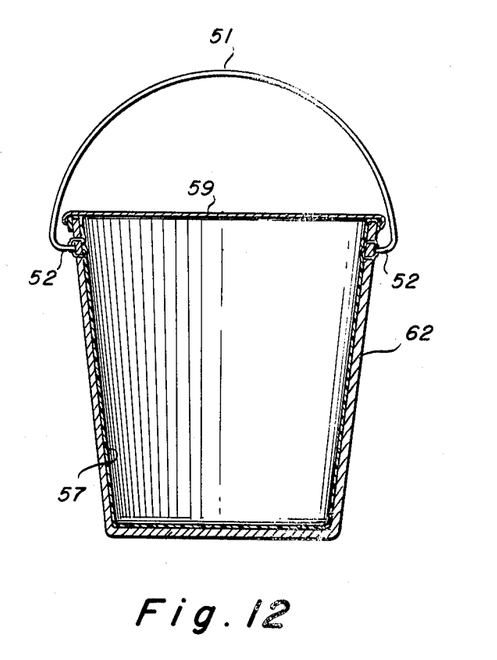
FIG. 12 is a sectional elevation showing a molded paper bucket having a liquid containing plastic bag suspended therein.
Figure 13:
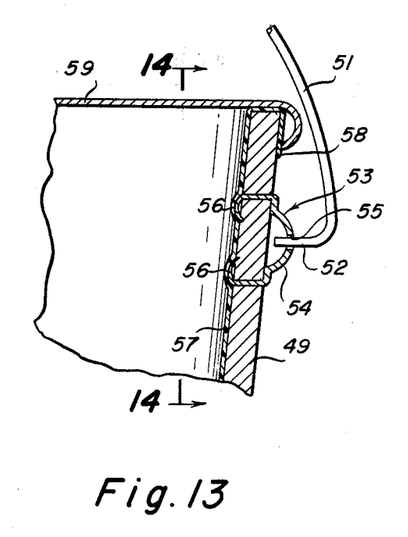
FIG. 13 is a sectional detail view partly broken away, showing the bail supporting bearing means attached to the paper wall of the container.

As shown in FIGS. 9 to 14, receptacles adapted to hold larger volumes of product are shown for shipping paint or the like. The molded paper container of FIG. 13 is more of a bucket-like shape. The basic container forming the subject of this invention that is shown in FIG. 9, is a cylindrical paper receptacle in the form of a gallon size container formed by spirally wrapping several plies of paper on a mandrel to make a lightweight but rigid can body 49 having crimped-on bottom means 50, as shown in FIG. 9. The container is provided with a bail handle 51 that can be the usual semicircular wire handle with inturned bearing ends 52 that are rotatably engaged in apertures provided in the dome-shaped bearing supports 53 attached to the wall of the container.

Figure 14:
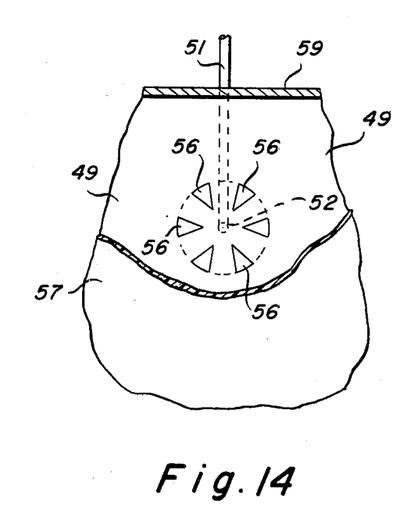
FIG. 14 is a broken-away view looking along line 14—14 of FIG. 13.

The bearing supports 53, best seen in FIGS. 13 and 14, are formed with a dome portion 54 having an aperture 55 for receiving bearings 52. The base of each of the bearing supports is provided with a plurality of tangs 56 that are adapted to be pushed through the wall of can body 49 from the outside and are staked or bent over against the inside wall to firmly attach the bearing support to the wall. A cooperating pair of the bearing supports 53 are attached at diametrically opposite positions to the upper end of the wall of can body 49 adjacent its mouth.

In order to seal the paper wall forming the can from contact with a fluid filled into the container, the inside of the container is lined with a plastic barrier liner 57 that is designed to snugly fit against the inside of wall 49 to cover the side and bottom walls of the can. The liner covers the staked tangs 56 and provides a fluidtight seal over the holes punctured in the paper side wall of the can 49 as the tangs are pressed through it. The liner 57 is designed to fit snugly to the container to be intimately supported by the wall and a portion of the liner extends over the mouth of the can so that a section 58 of the liner 57 can be turned down over the outside surface of wall 49. This section of the liner is then shrunk in place skintight as described above.

When the can contains paint, the container body 49 may be provided with a window aperture 60 to expose the clear plastic liner so that the color of the paint contained therein may be observed. The plastic liner in a paint can can be made sufficiently self-supporting to stretch across a small window without protruding substantially through it but if deemed desirable, a stiff plastic window could be mounted on the inside wall of the can to cover the window to support the liner in the can.

The window 60 can also be sued with certain of the smaller structres shown in FIGS. 1 through 8. The plastic liner can be produced with a number of laminations to control its stiffness so that when the contents of the can is placed under pressure or vacuum, the degree of pressure maintained in the unopened can can be observed. The existence of the window and the condition of the liner as observed through the window, positively indicate whether the desired condition has been maintained. In the case of an internal pressure, the degree of protuberance of the liner, ever so slightly into the window, proves that a pressure exists. When a reduced pressure is maintained in the container, the contracted condition of the suspended bag form of liner can be observed.

After the container has been filled with a liquid, a cover 59 may be fitted over the open mouth of the can, with the cover bearing tightly against the plastic liner. The cap engages the shrunk-on skirt 58 and is crimped into a fluid-tight engagement over the liner to seal the fluid in the container.

The container constructed as above described is well adapted for use in commerce. The liner, once fitted to the can, is firmly held in place within it to line the paper container. The liner is fully supported by the rigid wall so the two elements combine to provide a fluid tight container for fluid. When fluids are filled into the can, the liner not only preserves the paper wall from contact with the fluid, but it also seals the bent-over tangs 56 of the bail handle bearing support means. The container made as above described forms a fluid-tight shipping package having a sturdy support wall structure in the form of an inexpensive paper product that is lined with a film of plastic to contain the fluid. The simple tang mounted bearing supports 53 for the bail 51, completes the structure, making it possible to support a conventional wire bail handle on the paper wall of the container. The contents of the can may be seen without opening the can, through the window 60.

This structure provides an easily made, inexpensive, laminated, plastic and paper container that is well adapted for use in the retail trade for distributing such fluid products as paints, liquid food items, automotive oils, syrup, fluid chemicals that are inert with respect to the plastic liner and cover 32 and many other fluids or semifluid products such as oysters, fresh fruits and other foods that can be preserved in their own juices and the like.

Figure 10:
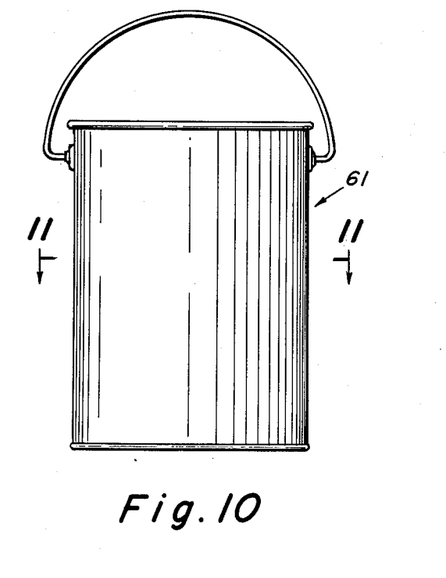
FIG. 10 is a convolute wrapped container body for liquid containers.

The support wall may be formed of a spirally wrapped paper material 49, as shown in FIG. 9, or a convolute paper wall 61 as shown in FIGS. 10 and 11 or a molded pulp bucket shape 62 as shown in FIG. 12. Each of these several forms of paper structures can be adapted to form a support wall for a plastic liner and bail bearing support as here taught.

The liner material as above described may be selected from the group of plastic films that can be reasonably shrunk around the mouth of the bucket, including polyethylene, polyurethanes and polyester resins that are impermeable to oxygen and nitrogen. A laminated polyvinyl chloride and polyester or polypropylene and polyvinyl chloride laminated film is preferably used having the desired number of laminations to provide the support for fluid at window 60.

While the above describes the preferred form of my invention, it is possible that other modifications thereof may occur to those skilled in the art that will fall within the scope of the following claims.

I claim:

1. A composite container having an outer support and an inner liner surrounding the space within the container and top and bottom rigid gas impervious cover means adapted to be seamed onto the container for cooperating with said liner to seal the contents placed in the storage space within the structure, comprising a fibrous tubular member having a generally circular crossection defined by exterior and interior walls and forming an open ended outer support member, said tubular means having an aperture therein to form a window, a tubular shrinkable plastic barrier film inner liner fitted within the support member for covering said window, said liner having a portion thereof extending beyond at least one of the ends of said tubular member, said liner being flexible and impervious to gas flow, said liner being sealed at one end and having said other open end extending from within the support member and beyond an open end of the support member to define the mouth of the tubular liner, a portion of the mouth of said liner that extends beyond the support member being folded over and around to overlap the exterior wall of the support member at said one end of said at least one of the ends of said support, the overlapped portion of the liner being heat shrunk to be wrinkle-free and tightly conforming to the exterior surface of the support member at said one end thereof, said heat shrunk overlapped portion of the mouth of the liner forming a plastic ring integral with that open end of the support member, said ring forming a smooth seat for cooperating with the top cover means seamed to the support member over said ring to seal the mouth of the liner, the bottom cover means being crimped to the other end of the support member, said plastic liner being supported within the fibrous member having a product stored within the liner which together with the cover means seamed to the support member over the ring forms a gastight impervious container enclosing the storage space for the product to protect such product when there is a difference in pressure between the storage space within the container and the pressure on the outside thereof, and said liner covering said window serving as a means through which the contents of the container can be visible while the condition of the liner exposed across said window indicates the maintenance of the pressure condition within the container.

2. A container as in claim 1 wherein a tubular plastic sleeve is shrunk over the outer surface of the composite container.

3. A container as in claim 2 wherein said sleeve engages over the outer periphery of said support member and the edge of said cap.

4. A container as in claim 2 wherein a rigid cap element is crimped onto the other end of the container and said shrunk-on sleeve engages the edges of said caps.

5. A container as in claim 1 wherein said liner is a tubular barrier layer having an open mouth at both ends that overlaps both ends of the support member, both of said overlapped ends being shrunk onto their respective overlapped ends of said support member and cap means crimped onto each of said ends to contain product within said container.

6. A paper container such as a can for paint or other fluids, said container being provided with a generally semi-circular bail handle having bearings on its ends that cooperate with bearing support means fixed to the opposite sides of the outside of the paper wall means of the container, comprising a structure wherein said wall means is a self-sustaining paper form, the container having a mouth defined by the upper periphery of said wall, bearing support means for said bail bearings, said bearing support means including elements disposed 180° apart around the outside of said side wall means adjacent the mouth of the container, said elements having bearing engaging means to cooperate with the bearings on the ends of the bail, said bearing support means having integral deformable elements adapted to be pushed through said paper wall means, said elements being deformed to lie flat against the inside surface of said wall means, a plastic liner adapted to be supported on the inside wall of said can to seal the fluid contained therein from penetrating the paper wall, said liner covering the deformed elements on the inside wall, and said liner having a portion wrapped over at least the end of the container that forms the mouth of the can, said wrapped-over portions being shrunk onto the outer periphery of the wall, and a cover for said can adapted to be sealed against said portion of the liner that is shrunk onto the outside wall of the container to seal the contents of said can within the liner and under the cover.

7. A paper container as in claim 6 comprising a structure wherein said bearing support means includes a pair of dome elements disposed 180° apart around the outside of said side wall means adjacent the mouth of the container, and said domed elements have bearing apertures therein to cooperate with the bearings on the ends of said pivoted bail.

8. A paper container as in claim 7 comprising a container wherein said domed elements have integral prongs adapted to be pushed through said paper side wall means and staked over against the inside surface of said wall means.

9. A paper container as in claim 6 comprising a structure wherein said side wall means is formed of a self-sustaining molded pulp paper structure.

10. A paper container as in claim 1 comprising a structure wherein said side wall means is formed of a self-sustaining spirally wrapped paper structure.

11. A paper container as in claim 1 comprising a structure wherein said side wall means is formed of a self-sustaining convolute paper structure.

12. A paper container as in claim 6 wherein said wall has an aperture therein and said liner covers said aperture to form a window through which the contents of the can are visible.

* * * * *